UNITED STATES PATENT OFFICE.

THOMAS A. EDISON, OF LLEWELLYN PARK, ORANGE, NEW JERSEY, ASSIGNOR TO EDISON STORAGE BATTERY COMPANY, OF WEST ORANGE, NEW JERSEY, A CORPORATION OF NEW JERSEY.

PROCESS OF MAKING STORAGE-BATTERY ELECTRODES.

No. 854,200.      Specification of Letters Patent.      Patented May 21, 1907.

Application filed March 30, 1905. Serial No. 252,930.

*To all whom it may concern:*

Be it known that I, THOMAS ALVA EDISON, a citizen of the United States, residing at Llewellyn Park, Orange, in the county of Essex and State of New Jersey, have invented a certain new and useful Process of Making Storage-Battery Electrodes, of which the following is a description.

In an application for Letters Patent of the United States, filed on even date herewith, Serial No. 252,929, I describe an improved storage battery electrode and several processes for making the same. The electrode in question is composed of a spongy or honey-comb integral mass of metallic cobalt or cobalt-nickel alloy, formed by subjecting a somewhat loosely assembled mass of flakes, foils or films thereof to a welding temperature, the active material being subsequently introduced within the porous conducting structure by successive immersions in a saturated solution of the active material followed by alternate evaporations to drive off the solvent.

My present application is designed to describe and claim one of the specific processes generally referred to in said application, and which, owing to the economy and facility with which it may be carried out practically, may be regarded as the preferred commercial process. To this end, and having in mind, the mechanical construction of the electrode disclosed in my patent No. 704,305 of July 8, 1902, I proceed substantially as follows: I first obtain scales, flakes, films or foils of cobalt or of cobalt-nickel alloy, secured in any suitable way, such as by electro-deposition, as I have described in my concurrent application, Serial No. 252,932 and which has been carefully annealed below the welding temperature in an inert gas, such as hydrogen. The two pocket sections are now engaged together as described in said patent, and securely held by crimping the edges of the outer section around the inner section. The upper end of these pockets is, however, not closed, but is left open like a sheath, so that opportunity is offered for introducing material into each pocket through the open mouth thus presented. The metallic flakes or foils are now introduced within the pocket in any suitable way, such as through a vibrating screen, under which are assembled a great number of pockets, the amount introduced at each operation being carefully regulated and a definite and uniform tamping pressure being applied after each increment has been added so as to secure substantial equality as to the amount of the conducting material introduced into each pocket and as to the porosity of the same throughout the entire mass. Uniformity in this respect will be also more nearly secured by first screening the metallic films, so that the same shall present bodies of approximately the same size. When the pocket or receptacle has been thus loosely filled with the conducting films or flakes, the pocket or receptacle is closed at its upper end and introduced within the supporting grid or other holder for the same. The grid carrying a series of pockets is now subjected to a welding temperature in a hydrogen atmosphere, resulting in the flakes or films being welded together and to the walls of the inclosing pockets, the sections of the latter being also welded together. As a result of this operation I obtain within each pocket a fine, quite soft, pithy readily compressible, sponge-like or honeycomb mass of insoluble metal or alloy, presenting innumerable cells, all connected together, and in bulk occupying only a fraction of the available space inclosed by each pocket and of such a character as to make good contact with the active material. The active material is now introduced within the sponge-like mass in any suitable way, as, for example, by dipping the electrodes successively in a saturated solution of the active material with alternate evaporations so as to deposit the active material in layers within the many cells, as I describe in my said concurrent application, Serial No. 252,929.

Having now described my invention, what I claim as new therein and desire to secure by Letters Patent is as follows:

1. The process of making alkaline storage battery electrodes which consists in introducing within a perforated electrode pocket, a loosely packed mass of substantially insoluble metallic flakes, scales or foils, and in then subjecting the same to a welding temperature to secure integrality thereof, as and for the purposes set forth.

2. The process of making storage battery electrodes, which consists in introducing within a perforated electrode pocket a loosely packed mass of flakes, foils or scales containing metallic cobalt, and in then subjecting the same to a welding temperature to secure integrality thereof, as and for the purposes set forth.

3. The process of making storage battery electrodes, which consists in introducing within the perforated electrode pocket a loosely packed mass of cobalt-nickel flakes, films or foils, and in then subjecting the same to a welding temperature to secure integrality thereof, as and for the purposes set forth.

This specification signed and witnessed this 29th day of March 1905.

THOMAS A. EDISON.

Witnesses:
FRANK L. DYER,
ANNA R. KLEHM.